United States Patent
Ando et al.

(10) Patent No.: US 8,913,949 B2
(45) Date of Patent: Dec. 16, 2014

(54) BASE STATION, RELAY STATION, AND METHOD

(75) Inventors: Kazuaki Ando, Shibuya (JP); Tsuyoshi Shimomura, Yokohama (JP); Hiroyuki Seki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 295 days.

(21) Appl. No.: 13/441,484

(22) Filed: Apr. 6, 2012

(65) Prior Publication Data

US 2012/0244796 A1 Sep. 27, 2012

Related U.S. Application Data

(63) Continuation of application No. PCT/JP2009/067518, filed on Oct. 7, 2009.

(51) Int. Cl.
*H04B 3/36* (2006.01)
*H04B 7/14* (2006.01)
*H04W 72/08* (2009.01)
*H04B 7/155* (2006.01)
*H04W 84/04* (2009.01)

(52) U.S. Cl.
CPC ............. *H04W 72/085* (2013.01); *H04B 7/155* (2013.01); *H04W 84/047* (2013.01)
USPC ............................................................ 455/7

(58) Field of Classification Search
CPC ... H04B 7/155; H04W 72/085; H04W 84/047
USPC ............................................. 455/7, 509, 561
See application file for complete search history.

(56) References Cited

U.S. PATENT DOCUMENTS

| | | | | |
|---|---|---|---|---|
| 2004/0160923 | A1* | 8/2004 | Nobukiyo et al. | 370/335 |
| 2008/0056174 | A1* | 3/2008 | Jung et al. | 370/315 |
| 2008/0108369 | A1* | 5/2008 | Visotsky et al. | 455/455 |
| 2008/0209301 | A1 | 8/2008 | Chang et al. | |
| 2008/0227461 | A1* | 9/2008 | Dayal et al. | 455/452.2 |
| 2009/0185492 | A1* | 7/2009 | Senarath et al. | 370/238 |
| 2013/0070661 | A1* | 3/2013 | Nagata et al. | 370/315 |

FOREIGN PATENT DOCUMENTS

| | | |
|---|---|---|
| EP | 1852986 | 11/2007 |
| JP | 2008211803 | 9/2008 |
| WO | 2006098273 | 9/2006 |
| WO | 2009072191 | 6/2009 |

OTHER PUBLICATIONS

International Search Report issued for corresponding to Japanese Patent Application No. PCT/JP2009067518 mailed Nov. 10, 2009.

\* cited by examiner

*Primary Examiner* — Yuwen Pan
*Assistant Examiner* — Fatuma Sherif
(74) *Attorney, Agent, or Firm* — Myers Wolin, LLC

(57) ABSTRACT

A base station is connected to a relay station that relays wireless signals from a mobile station. The base station includes a resource block assigning unit configured to generate first resource block assignment information of a first wireless section based on a first propagation quality of the first wireless section between the base station and the relay station; a ratio determining unit configured to calculate a ratio of a number of first resource blocks assigned to the first wireless section and a number of second resource blocks to be assigned to a second wireless section for transmitting the number of first resource blocks in the second wireless section between the relay station and the mobile station; and a transmitting unit configured to transmit the first resource block assignment information and the ratio to the relay station.

12 Claims, 13 Drawing Sheets

FIG.1
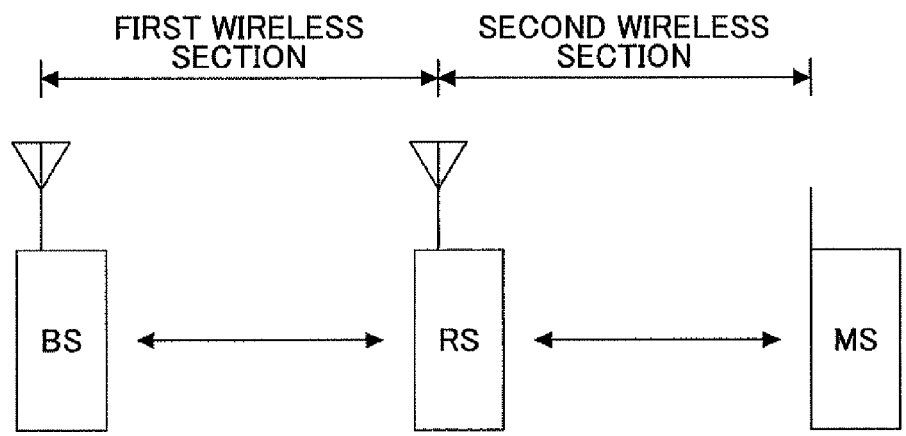
FIG.2
NUMBER OF RESOURCE BLOCKS : 25
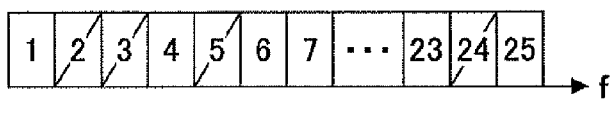
'0 1 1 0 1 0 0 ··· 0 1 0'  ← RESOURCE BLOCK ASSIGNMENT INFORMATION
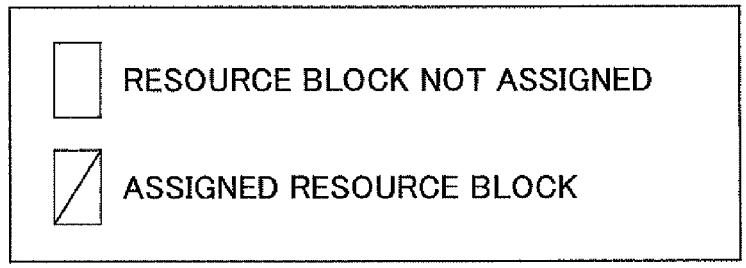

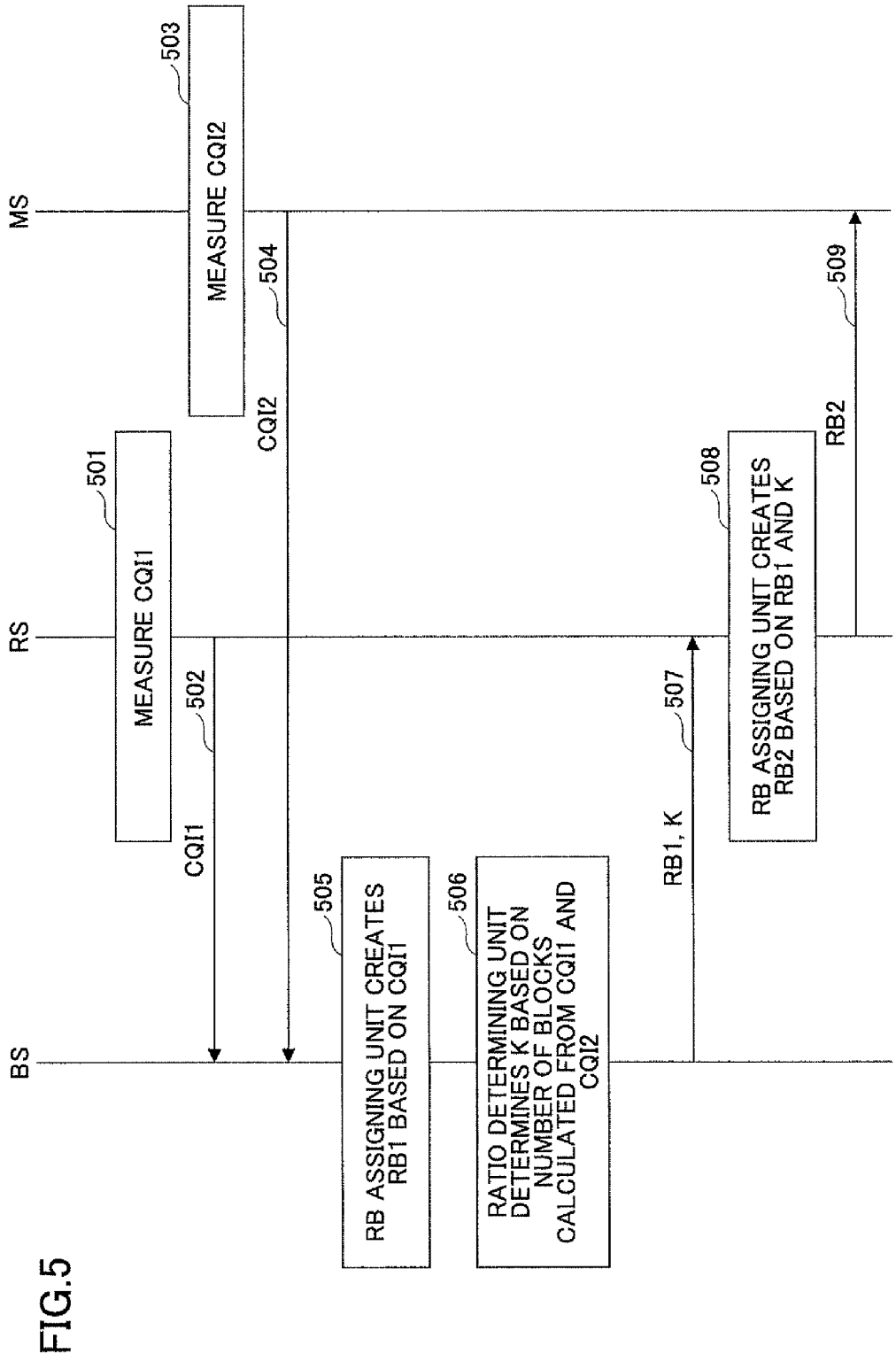

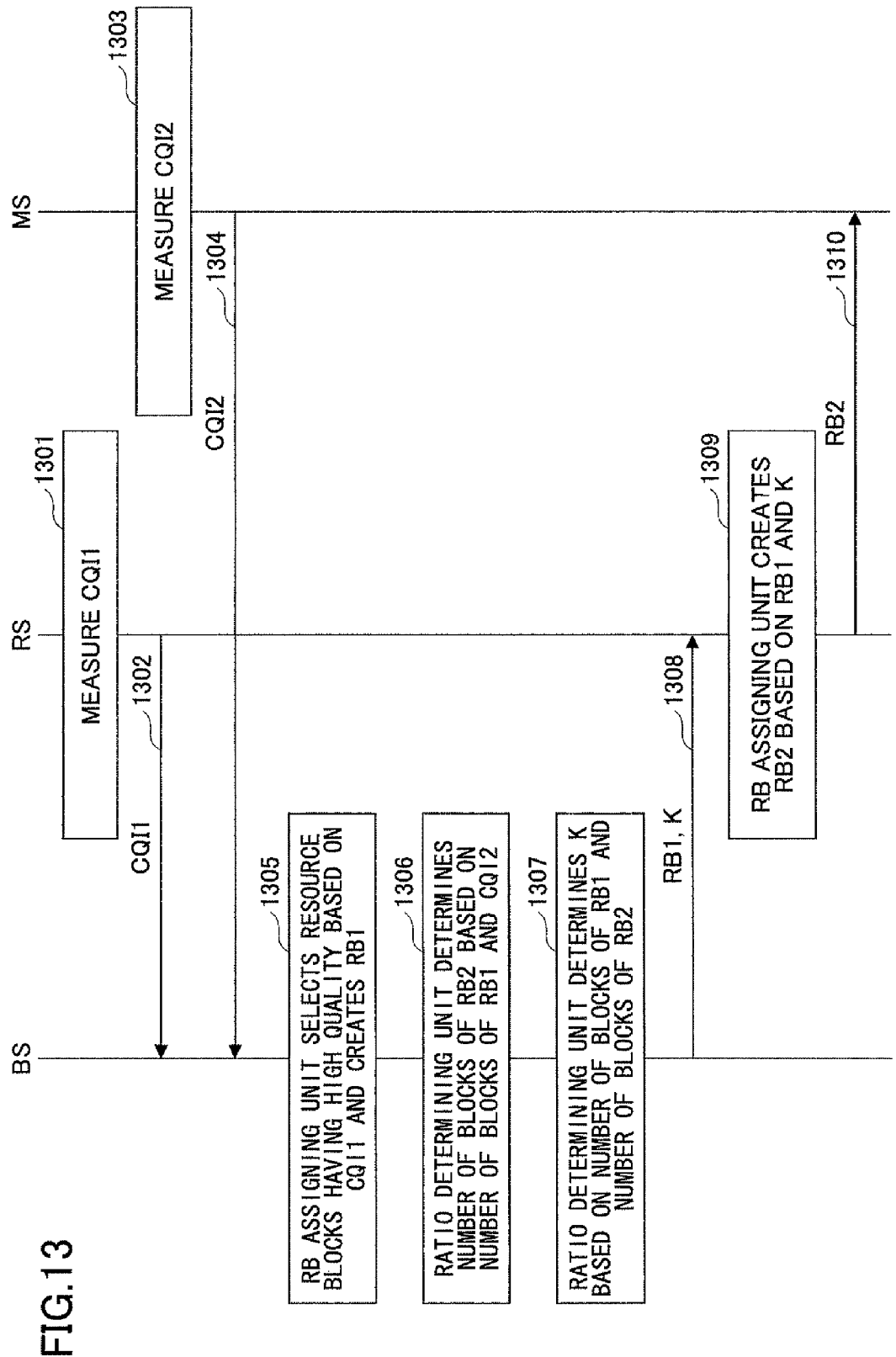

BASE STATION, RELAY STATION, AND METHOD

CROSS-REFERENCE TO RELATED APPLICATION

This patent application is a continuation of application PCT/JP2009/067518 filed on Oct. 7, 2009, now pending, the entire contents of which are herein wholly incorporated by reference.

FIELD

The embodiments discussed herein are related to transmitting/receiving control information in a wireless communication system including a base station and a relay station.

BACKGROUND

There is known a wireless communication system in which a base station communicates with a mobile station via a relay station. FIG. 1 is a schematic diagram of a conventional system including a base station, a relay station, and a mobile station. As illustrated in FIG. 1, the system includes a base station BS, a relay station RS, and a mobile station MS. There may be plural base stations BS, relay stations RS, and mobile stations MS.

The section between the base station BS and the relay station RS is a first wireless section, and the section between the relay station RS and the mobile station MS is a second wireless section. The first wireless section and the second wireless section have propagation qualities (for example, CQI: Channel Quality Indicator) that are independent of each other, and have different propagation qualities. Therefore, the respective wireless sections perform propagation control with the use of different control channels.

In a communication system in which communications are performed via a relay station, in order to implement the optimum scheduling in each wireless section, resource block assignment information is transmitted in each wireless section. The base station generates resource block assignment information for each of the first wireless section and the second wireless section. Accordingly, in the first wireless section, first resource block assignment information of the first wireless section and second resource block assignment information of the second wireless section are both transmitted.

The base station reports the resource blocks to be used to each mobile station, by transmitting the resource block assignment information indicating which resource blocks are assigned to each mobile station.

The resource block assignment information is in a bitmap format. Therefore, the resource block assignment information is to include the same number of bits as the number of resource blocks. FIG. 2 illustrates the resource block assignment information according to a conventional bitmap format. For example, resource blocks are assigned in units of resource block groups each including four consecutive resource blocks. In the case of a band of 20 MHz, as illustrated in FIG. 2, there are 100 resource blocks divided into 25 resource block groups. In this case, the resource block assignment information is to have 25 bits. In the following, a resource block group is simply referred to as a resource block.

Patent document 1: WO2006/098273

As described above, in the first wireless section in the wireless communication system including a relay station, the resource block assignment information of the first wireless section and the resource block assignment information of the second wireless section are transmitted. The resource block assignment information includes many bits, and therefore the load in the control channel is high. Accordingly, in an embodiment of the present invention, the number of bits in the resource block assignment information is reduced so that the load in the control channel is reduced.

SUMMARY

According to an aspect of the present invention, a base station connected to a relay station that relays wireless signals from a mobile station, includes a resource block assigning unit configured to generate first resource block assignment information of a first wireless section based on a first propagation quality of the first wireless section between the base station and the relay station; a ratio determining unit configured to calculate a ratio of a number of first resource blocks assigned to the first wireless section and a number of second resource blocks to be assigned to a second wireless section for transmitting the number of first resource blocks in the second wireless section between the relay station and the mobile station; and a transmitting unit configured to transmit the first resource block assignment information and the ratio to the relay station.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 1 is a schematic diagram of a conventional system including a base station, a relay station, and a mobile station;

FIG. 2 illustrates the resource block assignment information according to a conventional bitmap format;

FIG. 5 is a sequence diagram according to the first embodiment;

FIG. 13 is a sequence diagram according to the third embodiment; and

DESCRIPTION OF EMBODIMENTS

Preferred embodiments of the present invention will be explained with reference to accompanying drawings.

System Configuration

The present embodiment is applied to the same wireless communication system as that illustrated in FIG. 1.

First Embodiment: Base Station

Figure 3:
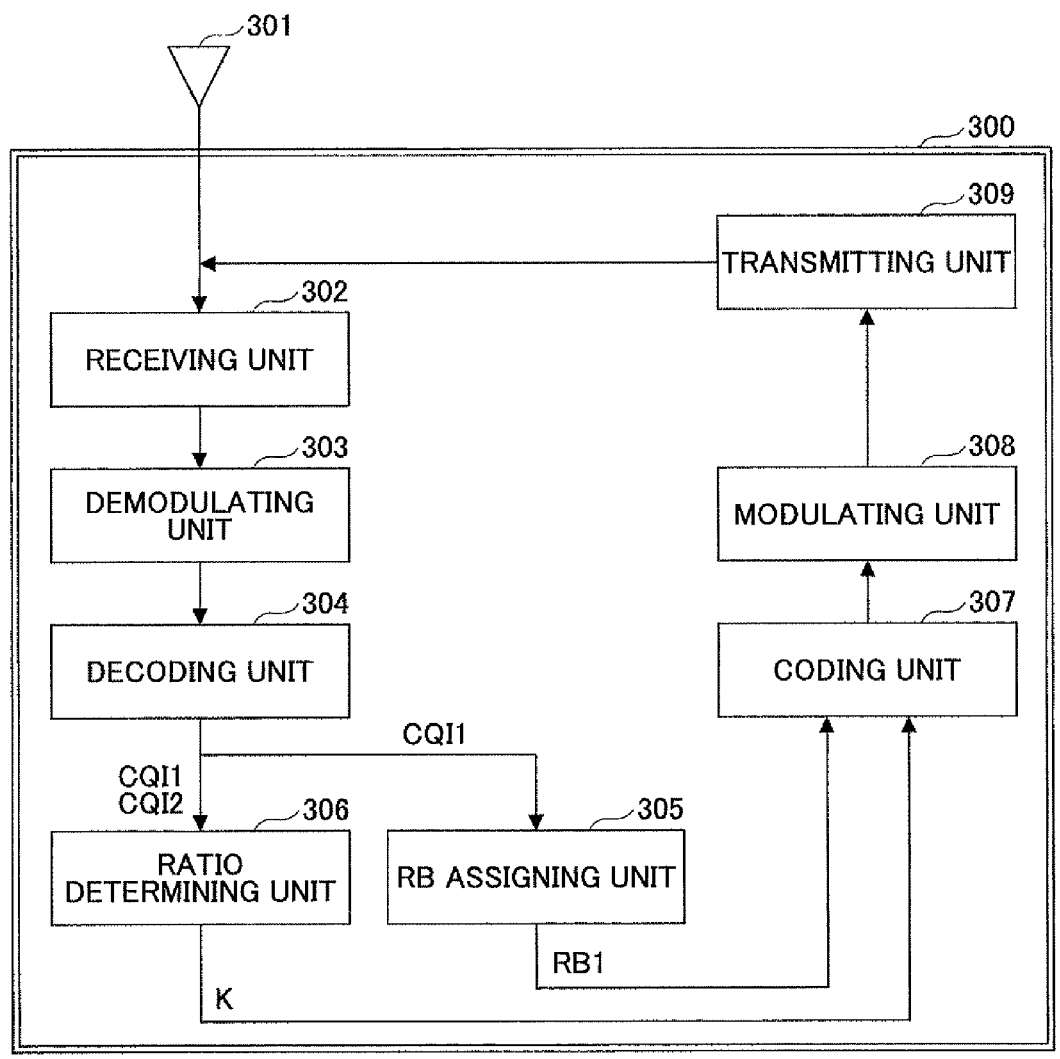
FIG. 3 is a block diagram of a base station according to a first embodiment.

FIG. 3 is a block diagram of a base station according to a first embodiment. A base station 300 corresponds to the base station BS in FIG. 1.

The base station 300 includes an antenna 301, a receiving unit 302, a demodulating unit 303, a decoding unit 304, a resource block (RB) assigning unit 305, a ratio determining unit 306, a coding unit 307, a modulating unit 308, and a transmitting unit 309. FIG. 3 only illustrates the processing system of control data, but the actual base station 300 also includes the processing system of user data (not shown).

The base station receives, from the relay station, a first propagation quality CQI1 that is the propagation quality of the first wireless section. Furthermore, the base station receives, from the mobile station via the relay station, a second propagation quality CQI2 that is the propagation quality of the second wireless section. The base station 300 receives these propagation qualities by the antenna 301, performs a wireless process on the propagation qualities by the receiving unit 302, demodulates the propagation qualities by the demodulating unit 303, and decodes the propagation qualities by the decoding unit 304. Accordingly, the first propagation quality CQI1 that is the propagation quality of the first wireless section and the second propagation quality CQI2 that is the propagation quality of the second wireless section are obtained.

The RB assigning unit 305 creates resource block assignment information of the first wireless section based on the first propagation quality CQI1. The resource block assignment information may be determined based on elements other than CQI, such as the service quality (quality of service: QoS), the amount of data remaining in the buffer, whether packets are re-sent, and the capability of the mobile station. As a matter of simplification, in the following description, only CQI is considered when creating resource block assignment information.

The ratio determining unit 306 calculates the number of resource blocks assigned from the first propagation quality CQI1 to the first wireless section, and calculates the number of resource blocks assigned from the second propagation quality CQI2 to the second wireless section. The ratio determining unit 306 calculates a ratio K of two resource blocks. The ratio K is the ratio of the number of first resource blocks assigned to the first wireless section and the number of second resource blocks assigned to the second wireless section for transmitting the first resource blocks in the second wireless section between the relay station and the mobile station.

The ratio K may be various values according to the number of bits for storing the ratio K. For example, the ratio K may be expressed in four ways using two bits, such as "0.5, 1, 2, 3" or "0.5, 1, 1.5, 2". Furthermore, when three bits are used, the ratio K may be expressed in eight ways.

The coding unit 307 codes first resource block assignment information RB1 of the first wireless section received from the RB assigning unit 305 and the ratio K received from the ratio determining unit 306.

The first resource block assignment information RB1 of the first wireless section and the ratio K are sent to the modulating unit 308 from the coding unit 307, modulated by the modulating unit 308, and transmitted to the relay station from the transmitting unit 309 via the antenna 301.

First Embodiment: Relay Station

Figure 4:
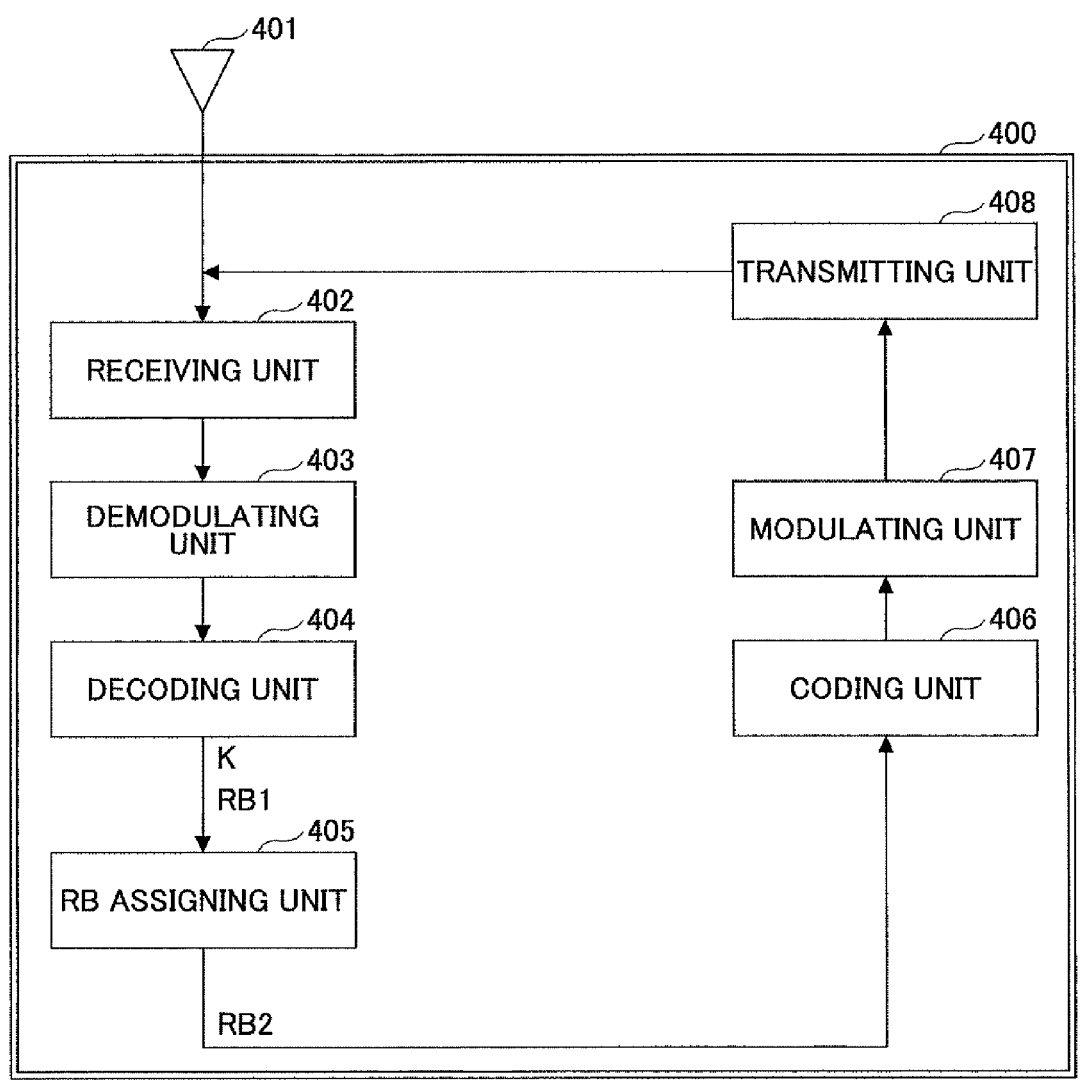
FIG. 4 is a block diagram of a relay station according to the first embodiment.

FIG. 4 is a block diagram of the relay station according to the first embodiment. A relay station 400 corresponds to the relay station RS in FIG. 1.

The relay station 400 includes an antenna 401, a receiving unit 402, a demodulating unit 403, a decoding unit 404, a resource block (RB) assigning unit 405, a coding unit 406, a modulating unit 407, and a transmitting unit 408. FIG. 4 only illustrates the processing system of control data, but the actual relay station 400 also includes the processing system of user data (not shown).

Based on the first resource block assignment information RB1 of the first wireless section and the ratio K received from the base station 300, the relay station 400 creates second resource block assignment information RB2 of the second wireless section. The relay station 400 receives the first resource block assignment information RB1 and the ratio K by the antenna 401, performs a wireless process on the information by the receiving unit 402, demodulates the information by the demodulating unit 403, and decodes the information by the decoding unit 404. Accordingly, the first resource block assignment information RB1 of the first wireless section and the ratio K are obtained.

The RB assigning unit 405 creates second resource block assignment information RB2 of the second wireless section based on the first resource block assignment information RB1 and the ratio K. The second resource block assignment information RB2 may be determined based on elements other than the first resource block assignment information RB1 and the ratio K, such as the service quality (quality of service: QoS), the amount of data remaining in the buffer, whether packets are re-sent, and the capability of the mobile station. As a matter of simplification, in the following description, only the first resource block assignment information RB1 and the ratio K are considered when creating second resource block assignment information RB2.

For example, the RB assigning unit 405 may assign the resource blocks of the second wireless section in the same order as that of the first wireless section. Furthermore, as described below with reference to FIGS. 6A through 7C, the second resource block assignment information RB2 may be created by changing the first resource block assignment information RB1 with the use of the ratio K.

First Embodiment: Sequence

FIG. 5 is a sequence diagram according to the first embodiment. In FIG. 5, BS, RS, and MS correspond to the base station BS, the relay station RS, and the mobile station MS of FIG. 1, respectively, and BS and RS also correspond to the base station 300 of FIG. 3 and the relay station 400 of FIG. 4, respectively.

In step 501, the relay station (RS) 400 measures the first propagation quality CQI1 of the first wireless section between the base station (BS) 300 and the relay station (RS) 400.

In step 502, the relay station (RS) 400 transmits the measured first propagation quality CQI1 to the base station (BS) 300.

In step 503, the mobile station (MS) measures the second propagation quality CQI2 in the second wireless section between the relay station (RS) 400 and the mobile station (MS).

In step 504, the mobile station (MS) transmits the measured second propagation quality CQI2 to the base station (BS) 300 via the relay station (RS) 400.

Steps 501 through 504 are executed periodically or at arbitrary timings by the relay station (RS) 400 and the mobile station (MS) according to instructions from the base station (BS) 300. Furthermore, by measuring the CQI of each resource block, the base station (BS) 300 may select resource blocks having good propagation qualities to create the first resource block assignment information RB1. Alternatively, the CQI of each resource block group may be measured.

In step 505, the RB assigning unit 305 of the base station (BS) 300 creates the first resource block assignment information RB1 of the first wireless section, based on the first propagation quality CQI1 received from the relay station (RS) 400 in step 502. The first resource block assignment information RB1 is created by selecting resource blocks in a descending order of CQI, corresponding to the band requested by the mobile station (MS).

In step 506, the ratio determining unit 306 of the base station (BS) 300 calculates the number of blocks to be assigned to the first wireless section from the first propagation quality CQI1 received in step 502, and calculates the number of blocks to be assigned to the second wireless section from the second propagation quality CQI2 received in step 504. The ratio determining unit 306 calculates the ratio K of the calculated numbers of blocks.

In step 507, the transmitting unit 309 of the base station (BS) 300 transmits, to the relay station (RS) 400, the first resource block assignment information RB1 created in step 505 and the ratio K calculated in step 506.

In step 508, the relay station (RS) 400 passes, to the RB assigning unit 405, the first resource block assignment information RB1 and the ratio K received in step 507, via the antenna 401, the receiving unit 402, the demodulating unit 403, and the decoding unit 404. The RB assigning unit 405 creates the second resource block assignment information RB2 of the second wireless section based on the first resource block assignment information RB1 and the ratio K received in step 507.

In step 509, the second resource block assignment information RB2 created in step 508 is transmitted to the mobile station (MS) via the coding unit 406, the modulating unit 407, the transmitting unit 408, and the antenna 401.

First Embodiment: Resource Block Assignment Information

With reference to FIGS. 6A through 7C, a description is given of a method of generating resource block assignment information. As described above, the first resource block assignment information RB1 is created by the RB assigning unit 305 (FIG. 3) of the base station (BS) 300 (step 505 of FIG. 5), and the ratio K is obtained by the ratio determining unit 306 (FIG. 3) of the base station (BS) 300 (step 506 of FIG. 5). Furthermore, the second resource block assignment information RB2 is created by the RB assigning unit 405 (FIG. 4) of the relay station (RS) 400 (step 508 of FIG. 5).

Figure 6A:
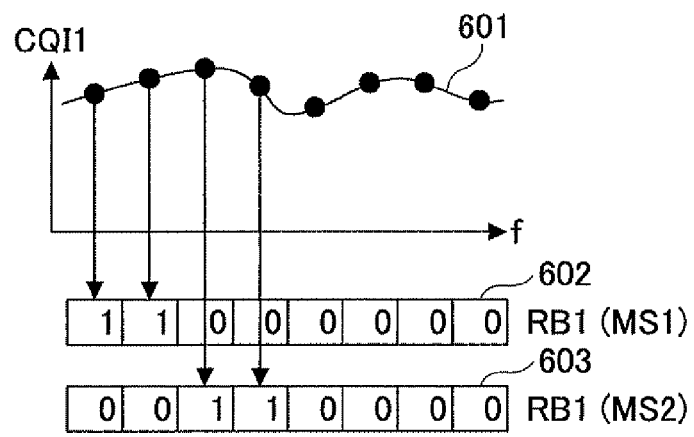
FIGS. 6A through 6C are for describing a first example of creating resource block assignment information according to the first embodiment.
Figure 6B:
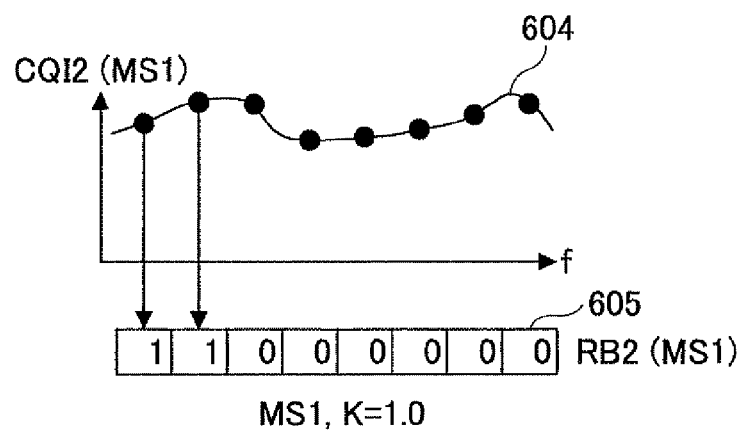
Figure 6C:
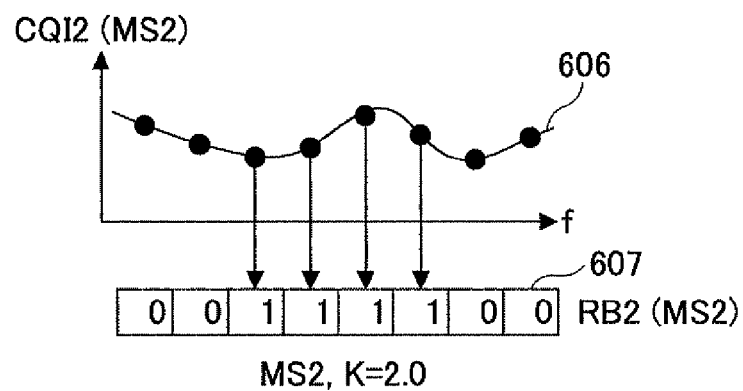

FIGS. 6A through 6C are for describing a first example of creating resource block assignment information according to the first embodiment. FIG. 6A illustrates a relationship 601 between a frequency f of the first wireless section and the first propagation quality CQI1, and the generated first resource block assignment information RB1. In this example, resource blocks are assigned to two mobile stations MS1 and MS2. FIGS. 6B and 6C illustrate the assignment of resource blocks in the second wireless section of the mobile stations MS1 and MS2, respectively.

As illustrated in FIG. 6A, the RB assigning unit 305 of the base station (BS) 300 assigns resource blocks used in the first wireless section of the mobile stations, according to first propagation quality CQI1 of the first wireless section.

In the mobile station MS1, two resource blocks corresponding to the lowest and second lowest frequencies f are assigned. As a result, the first resource block assignment information RB1 for the mobile station MS1 in the first wireless section becomes "11000000" (602). Furthermore, in the mobile station MS2, two resource blocks corresponding to the third and fourth lowest frequencies f are assigned. As a result, the first resource block assignment information RB1 for the mobile station MS2 in the first wireless section becomes "00110000" (603). As a matter of simplification, the resource block assignment information is expressed by eight bits, but the number of bits varies according to the band being used.

FIG. 6B illustrates the assignment of resource blocks in the second wireless section of the mobile station MS1. As for the mobile station MS1, when CQI of approximately the same level is obtained in the first wireless section and the second wireless section (604), in the second wireless section, the same number of resource blocks as that of the first wireless section is to be assigned to the mobile station MS1. Accordingly, the ratio K of the number of resource blocks in the first wireless section and the number of resource blocks in the second wireless section is 1.0.

In the case of K=1.0, the RB assigning unit 405 of the relay station (RS) 400 repeats each bit in RB1 "11000000" (602) one time to create the second resource block assignment information RB2 for the mobile station MS1. As a result, RB2 becomes "11000000" (605), which is the same as RB1 (602).

FIG. 6C illustrates the assignment of resource blocks in the second wireless section of the mobile station MS2. For example, as for the mobile station MS2, when the second propagation quality CQI2 of the second wireless section is half the first propagation quality CQI1 of the first wireless section (606), in the second wireless section, a number of resource blocks that is two times as that of the first wireless section is to be assigned to the mobile station MS2. Accordingly, the ratio K of the number of resource blocks in the first wireless section and the number of resource blocks in the second wireless section is 2.0.

In the case of K=2.0, the RB assigning unit 405 of the relay station (RS) 400 repeats each bit in RB1 "00110000" (603) two times to create the second resource block assignment information RB2 for the mobile station MS2. As a result, RB2 becomes "00001111" (607).

Figure 7A:
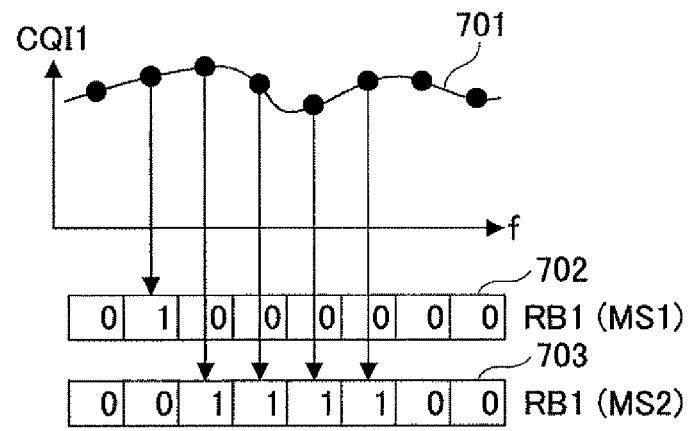
FIGS. 7A through 7C are for describing a second example of creating resource block assignment information according to the first embodiment.
Figure 7B:
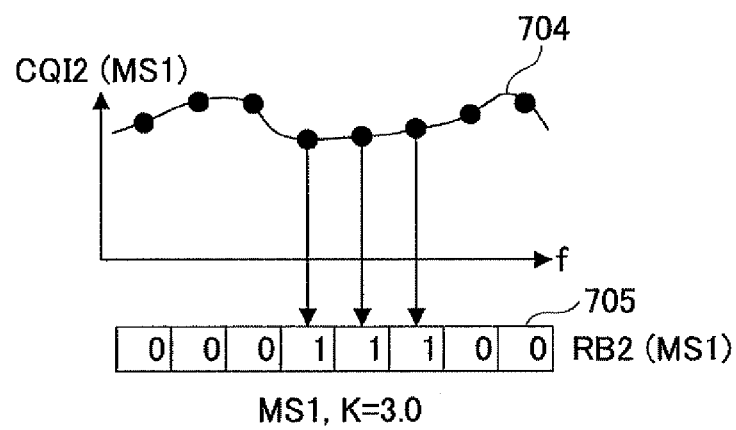
Figure 7C:
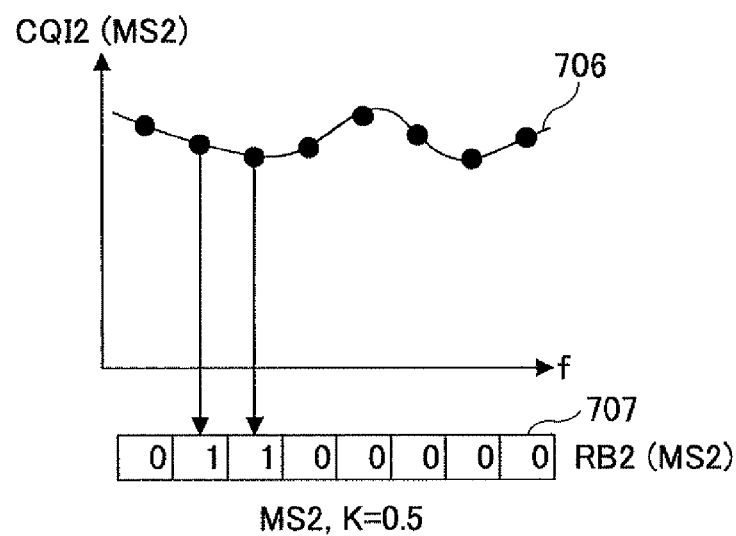

FIGS. 7A through 7C are for describing a second example of creating resource block assignment information according to the first embodiment. In FIGS. 7A through 7C, the ratios K are different from those used in FIGS. 6A through 6C. The elements denoted by 701 through 707 in FIGS. 7A through 7C correspond to the elements denoted by 601 through 607 in FIGS. 6A through 6C.

As illustrated in FIG. 7A, the RB assigning unit 305 of the base station (BS) 300 creates first resource block assignment information RB1 "01000000" (702) for the mobile station MS1, and first resource block assignment information RB1 "00111100" (703) for the mobile station MS2.

FIG. 7B illustrates the assignment of resource blocks in the second wireless section of the mobile station MS1. For example, as for the mobile station MS1, when the second propagation quality CQI2 (704) of the second wireless section is one-third of the first propagation quality CQI1 of the first wireless section, in the second wireless section, a number of resource blocks that is three times as that of the first wireless section is to be assigned to the mobile station MS1. Accordingly, the ratio K of the number of resource blocks in the first wireless section and the number of resource blocks in the second wireless section is 3.0.

In the case of K=3.0, the RB assigning unit 405 of the relay station (RS) 400 repeats each bit in RB1 "01000000" (702)

three times to create the second resource block assignment information RB2 for the mobile station MS1. As a result, RB2 becomes "00011100" (705).

FIG. 7C illustrates the assignment of resource blocks in the second wireless section of the mobile station MS2. For example, as for the mobile station MS2, when the second propagation quality CQI2 of the second wireless section is two times the first propagation quality CQI1 of the first wireless section (706), in the second wireless section, a number of resource blocks that is half that of the first wireless section is to be assigned to the mobile station MS2. Accordingly, the ratio K of the number of resource blocks in the first wireless section and the number of resource blocks in the second wireless section is 0.5.

In the case of K=0.5, the RB assigning unit 405 of the relay station (RS) 400 repeats each bit in RB1 "00111100" (703) 0.5 times to create the second resource block assignment information RB2 for the mobile station MS2. As a result, RB2 becomes "01100000" (707).

As described above, the relay station may create the second resource block assignment information RB2 of the second wireless section based on the ratio K of the first propagation quality CQI1 of the first wireless section and the second wireless section, and the first resource block assignment information RB1 of the first wireless section. Accordingly, the base station is to transmit only the ratio K, instead of transmitting the second resource block assignment information RB2 in the bitmap format, and therefore the traffic using the control channel between the base station and the relay station is reduced.

Second Embodiment: Base Station

Figure 8:
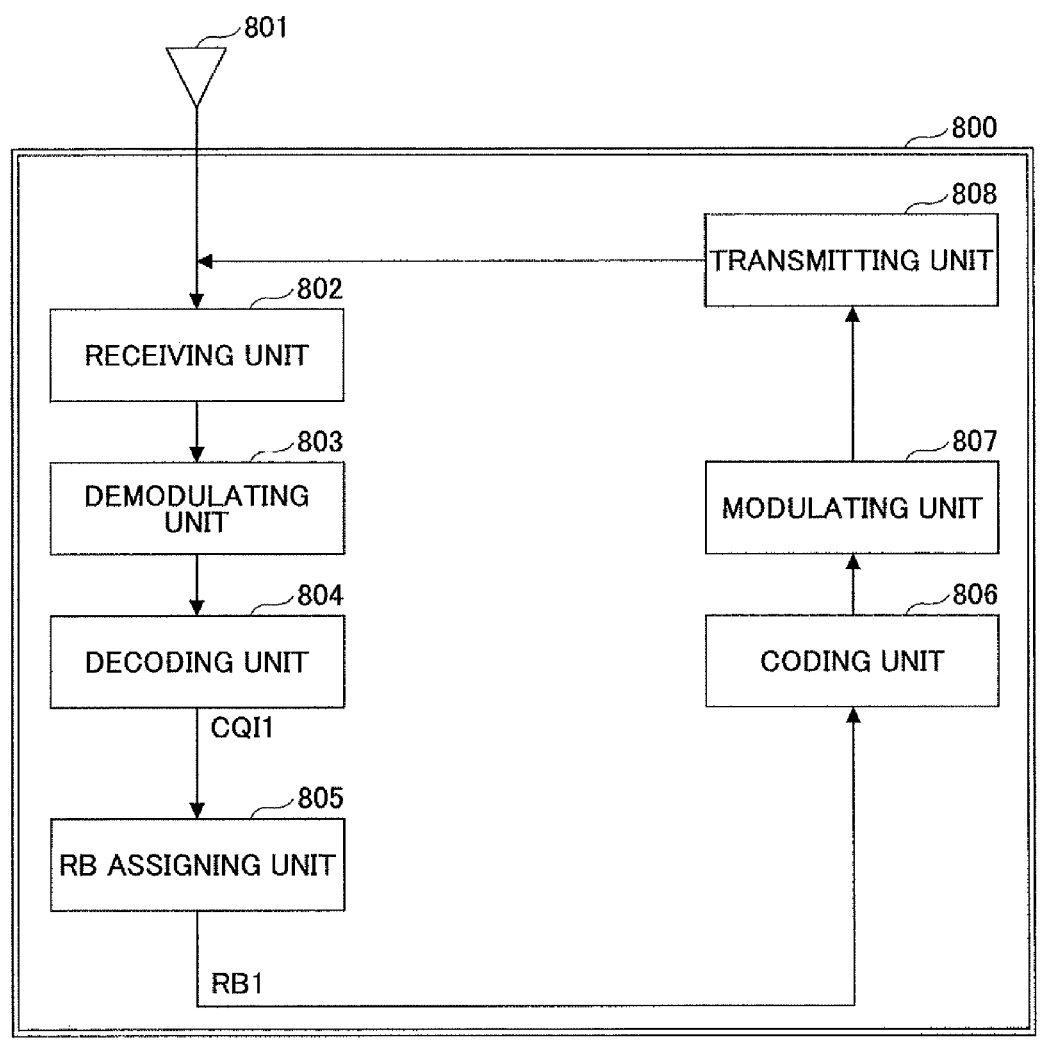
FIG. 8 is a block diagram of a base station according to a second embodiment.

FIG. 8 is a block diagram of a base station according to a second embodiment. The elements denoted by 800 through 808 of FIG. 8 correspond to the elements denoted by 300 through 305 and 307 through 309 of FIG. 3.

In the second embodiment, the base station 800 creates the first resource block assignment information RB1 of the first wireless section by the RB assigning unit 805, and transmits the first resource block assignment information RB1 to the relay station.

Second Embodiment: Relay Station

Figure 9:
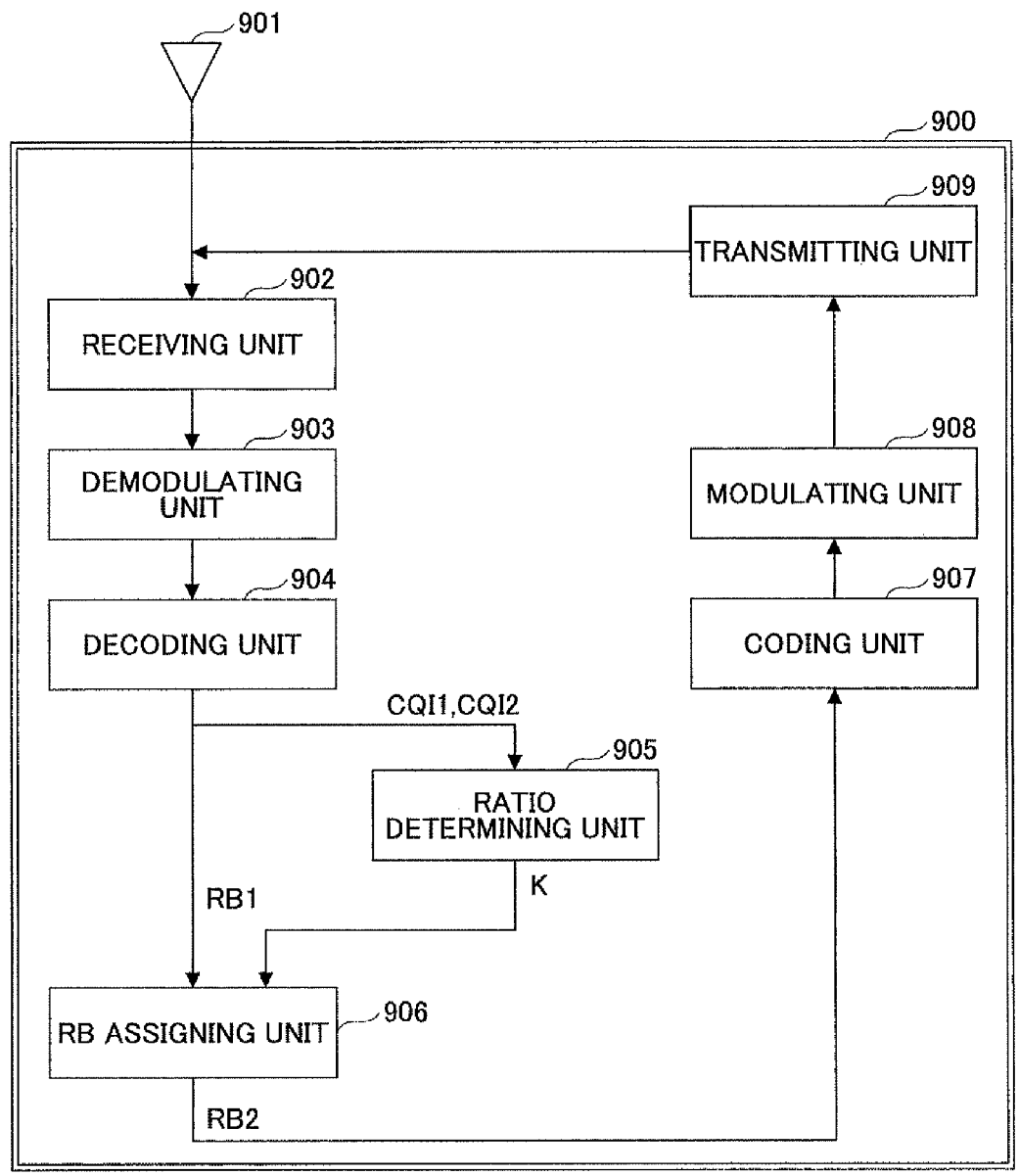
FIG. 9 is a block diagram of a relay station according to the second embodiment.

FIG. 9 is a block diagram of the relay station according to the second embodiment. FIG. 9 is different from FIG. 4 in that a ratio determining unit 905 is included. The elements denoted by 900 through 904 and 906 through 909 of FIG. 9 correspond to the elements denoted by 400 through 408 of FIG. 4.

The relay station 900 measures the first propagation quality CQI1 in the first wireless section. Furthermore, the relay station 900 receives the second propagation quality CQI2 of the second wireless section from the mobile station by the antenna 901, performs a wireless process on the second propagation quality CQI2 by the receiving unit 902, demodulates the second propagation quality CQI2 by the demodulating unit 903, and decodes the second propagation quality CQI2 by the decoding unit 904. Accordingly, the second propagation quality CQI2 of the second wireless section is obtained.

The ratio determining unit 905 derives the number of resource blocks assigned from the first propagation quality CQI1 to the first wireless section, and derives the number of resource blocks assigned from the second propagation quality CQI2 to the second wireless section. Alternatively, the ratio determining unit 905 may calculate the number of resource blocks assigned by the first resource block assignment information RB1 received from the base station 800. The ratio determining unit 905 calculates the ratio K of numbers of resource blocks of the first and second wireless sections.

The RB assigning unit 906 creates the second resource block assignment information RB2 of the second wireless section in the same manner as the first embodiment, based on the first resource block assignment information RB1 received from the base station 800 and the ratio K received from the ratio determining unit 905.

Second Embodiment: Sequence

Figure 10:
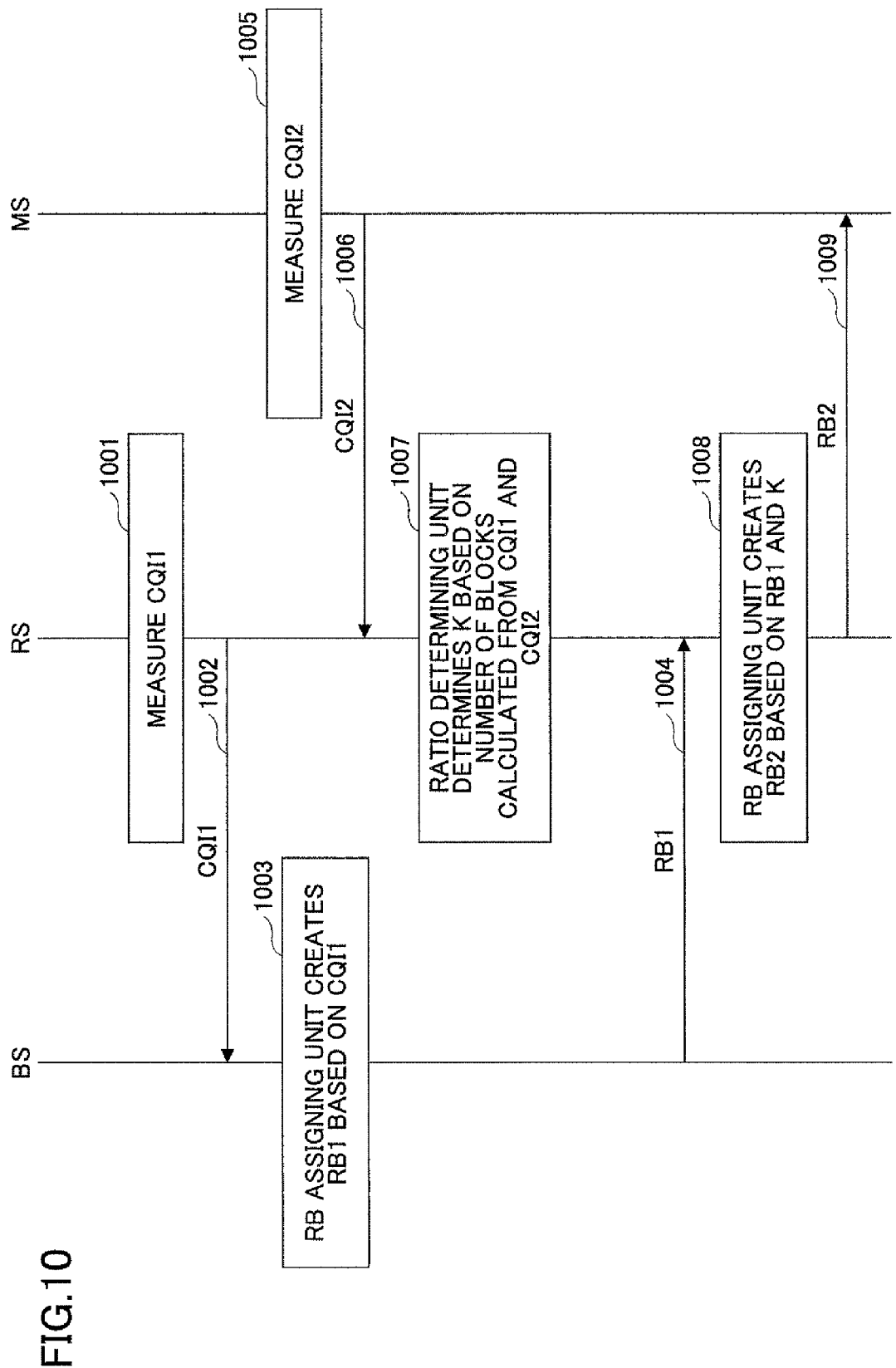
FIG. 10 is a sequence diagram according to the second embodiment.

FIG. 10 is a sequence diagram according to the second embodiment. FIG. 10 is different from FIG. 5 in that the relay station (RS) 900 determines the ratio K.

Steps 1001 through 1003 are the same as steps 501, 502, and 505 of FIG. 5.

In step 1004, the transmitting unit 808 of the base station (BS) 800 transmits the first resource block assignment information RB1 created in step 1003 to the relay station (RS) 900.

Steps 1005 and 1006 are the same as steps 503 and 504 of FIG. 5. The relay station (RS) 900 does not have to relay, to the base station (BS) 800, the second propagation quality CQI2 of the second wireless section received from the mobile station (MA).

In step 1007, the ratio determining unit 905 of the relay station (RS) 900 calculates the number of blocks assigned from the first propagation quality CQI1 measured by itself to the first wireless section, and calculates the number of blocks assigned from the second propagation quality CQI2 received in step 1006 to the second wireless section. Step 1007 may be executed after step 1004, so that the ratio determining unit 905 may calculate the number of blocks assigned from the first resource block assignment information RB1 received in step 1004 to the first wireless section. The ratio determining unit 905 calculates the ratio K of the calculated number of blocks.

In step 1008, the relay station (RS) 900 passes, to the RB assigning unit 906, the first resource block assignment information RB1 received in step 1004, via the antenna 901, the receiving unit 902, the demodulating unit 903, and the decoding unit 904. The RB assigning unit 906 creates the second resource block assignment information RB2 of the second wireless section based on the first resource block assignment information RB1 received in step 1004 and the ratio K calculated by the ratio determining unit 905.

In step 1009, the second resource block assignment information RB2 created in step 1008 is transmitted to the mobile station via the coding unit 907, the modulating unit 908, the transmitting unit 909, and the antenna 901.

Second Embodiment: Resource Block Assignment Information

The methods of generating the first resource block assignment information RB1 and the second resource block assignment information RB2 are the same as those of the first and third embodiments and are thus not further described.

Third Embodiment: Base Station

In the first embodiment, the RB assigning unit 305 of the base station 300 generates the first resource block assignment information RB1 based on an average ratio K of the first wireless section and the second wireless section determined by the ratio determining unit 306. Meanwhile, in the third embodiment, the ratio K is calculated after determining the positions in the frequency area at which the resource blocks are to be assigned, for both the first wireless section and the second wireless section, and then the resource block assignment information is created. Accordingly, the frequency usage efficiency in the second wireless section is improved.

Figure 11:
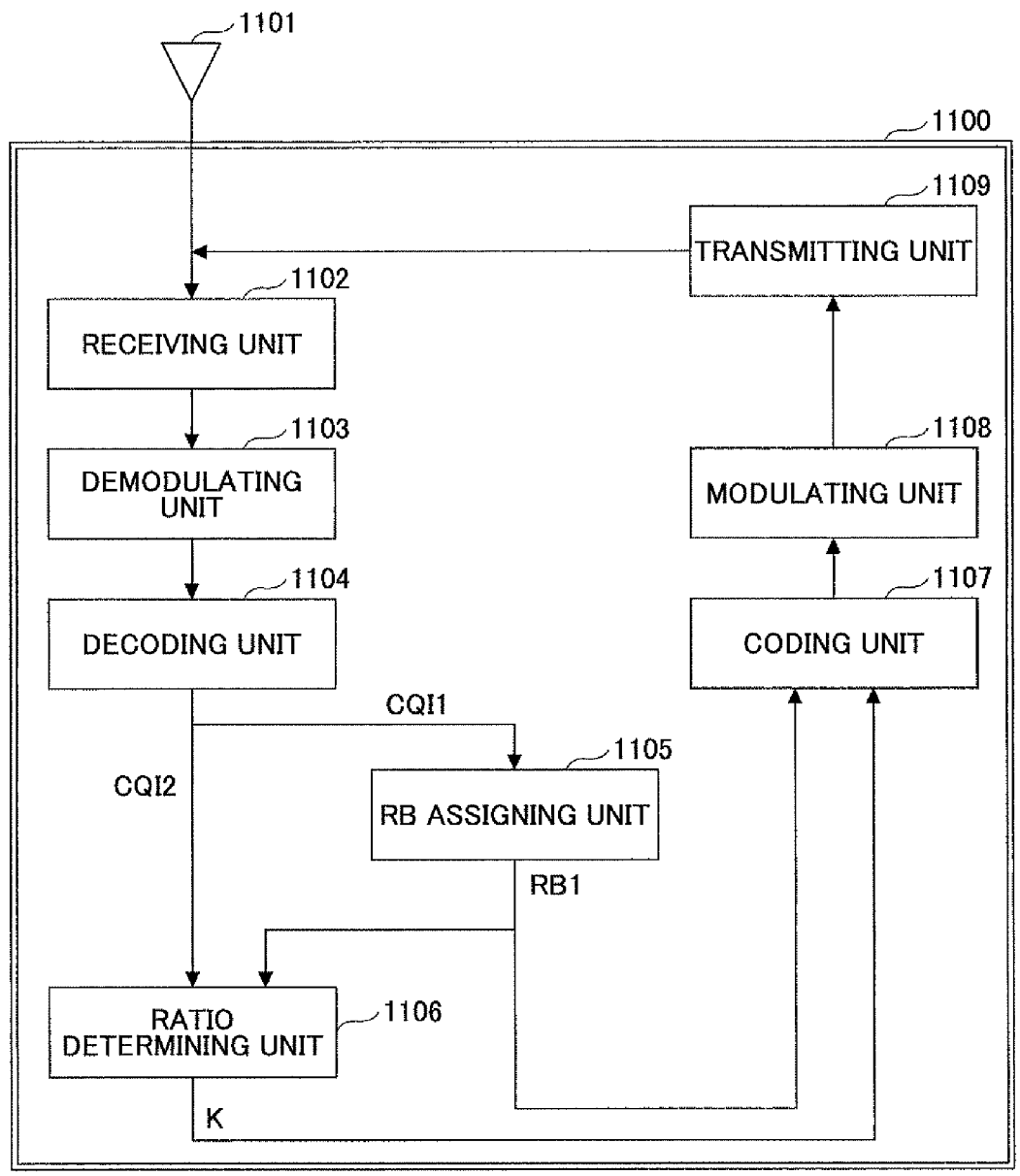
FIG. 11 is a block diagram of a base station according to a third embodiment.

FIG. 11 is a block diagram of a base station according to the third embodiment. FIG. 11 is different from FIG. 3 in that the first resource block assignment information RB1 generated by a RB assigning unit 1105 is also passed to a ratio determining unit 1106. The elements denoted by 1100 through 1109 of FIG. 11 correspond to the elements denoted by 300 through 309 of FIG. 3.

The RB assigning unit 1105 selects the resource block having a high first propagation quality CQI1, and creates the first resource block assignment information RB1. For example, the RB assigning unit 1105 preferentially selects resource blocks having a high propagation quality from the resource blocks having a high first propagation quality CQI1, and creates the first resource block assignment information RB1. Furthermore, the first resource block assignment information RB1 may be created by selecting the resource blocks having a higher CQI1 than a predetermined value in the order of the numbers of the resource blocks.

The ratio determining unit 1106 calculates the ratio K, with the use of the first resource block assignment information RB1 received from the RB assigning unit 1105 and the second propagation quality CQI2 received form the relay station.

Specifically, the ratio determining unit 1106 calculates the ratio as follows. First, the ratio determining unit 1106 derives the number of resource blocks assigned to the first wireless section, from the first resource block assignment information RB1. Next, to realize the same propagation quality as the first wireless section, the ratio determining unit 1106 calculates, based on the second propagation quality CQI2, the number of resource blocks starting from the leading resource block, which are to be assigned in the second wireless section. Finally, the ratio determining unit 1106 calculates the ratio K based on the number of resource blocks assigned to the first wireless section and the number of resource blocks to be assigned to the second wireless section.

When there are plural mobile stations, an offset value is used, which expresses the number of resource blocks starting from the leading resource block in the second wireless section that are not to be assigned to each mobile station. For example, when it is possible to assign resource blocks to a first mobile station starting from the leading resource block, the offset value for the first mobile station is "0". When it is possible to assign resource blocks starting from the third resource block to a second mobile station, but it is not possible to assign the leading resource block and the second resource block to the second mobile station, the offset value for the second mobile station is "2".

When an offset value is used, the number of resource blocks to be assigned in the second wireless section is expressed by the number of resource blocks from the resource block having a number obtained by adding one to the offset value.

Third Embodiment: Relay Station

Figure 12:
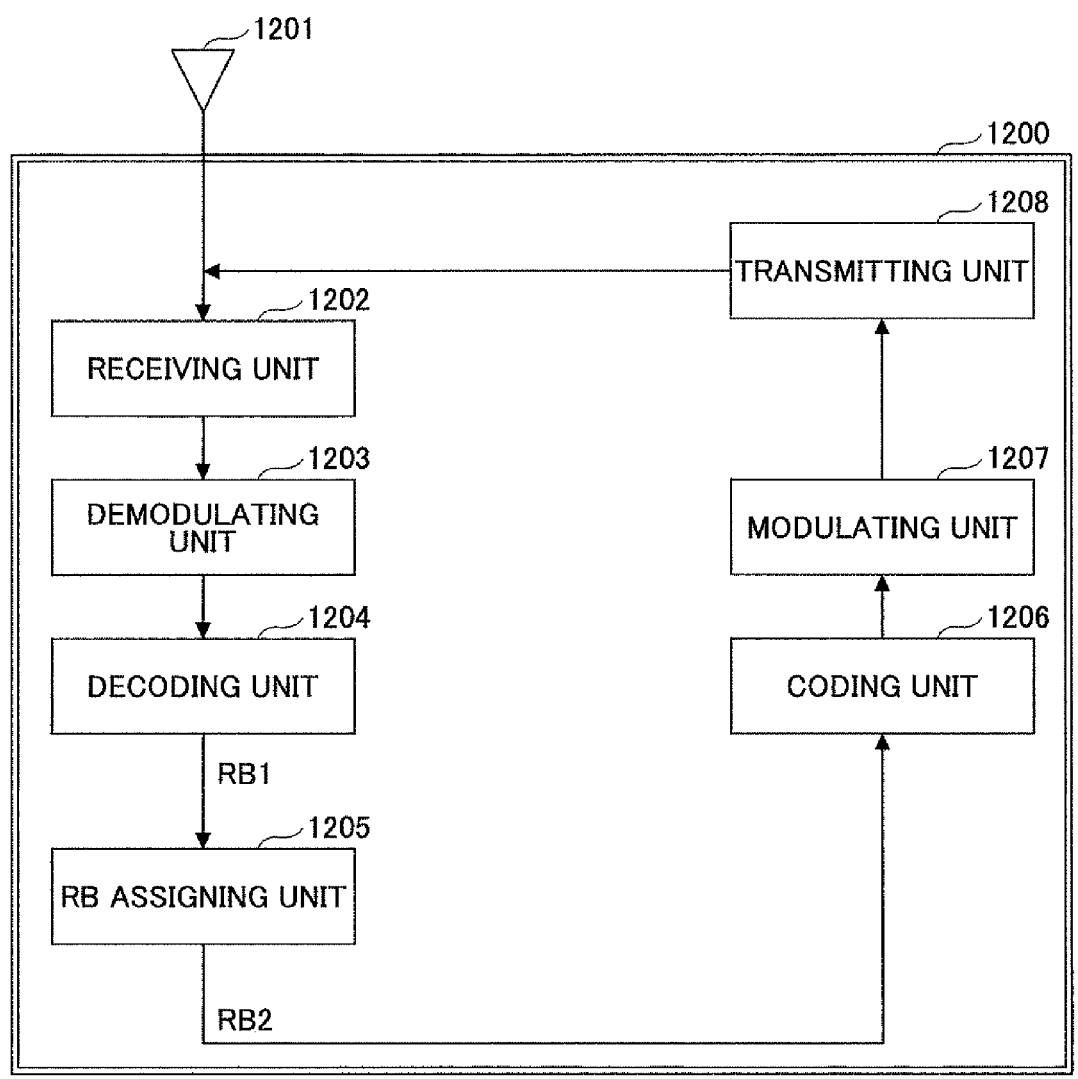
FIG. 12 is a block diagram of a relay station according to the third embodiment.

FIG. 12 is a block diagram of a relay station according to the third embodiment. FIG. 12 illustrates the same configuration as that of FIG. 4, except that the operation of a RB assigning unit 1205 is different. The elements denoted by 1200 through 1208 in FIG. 12 correspond to the elements denoted by 400 through 408 in FIG. 4.

The RB assigning unit 1205 of the relay station 1200 generates the second resource block assignment information RB2 of the second wireless section based on the first resource block assignment information RB1 and the ratio K received from the base station 1100.

The RB assigning unit 1205 assigns, for each mobile station, resource blocks in the second wireless section as follows. Specifically, the number of resource blocks assigned by the first resource block assignment information RB1 is multiplied by the ratio K. Then, the number of resource blocks corresponding to the multiplication result are assigned, starting from the resource block having a number obtained by adding one to the offset value. Accordingly, in the second wireless section, resource locks are continuously assigned for each mobile station.

Furthermore, the offset value may be determined in the order decoding is done for each mobile station. For example, an offset value=0 is determined for the first mobile station, and two resource blocks are assigned. An offset value=2 is set for the next mobile station, and four resource blocks are assigned. An offset value=6 is set for the next mobile station, and three resource blocks are assigned. In this manner, the offset value and the number of resource blocks to be assigned may be determined based on the offset value and the number of assigned resource blocks of the previous mobile station.

Third Embodiment: Sequence

FIG. 13 is a sequence diagram according to the third embodiment. FIG. 13 is different from FIG. 5 in terms of the method of determining the first resource block assignment information RB1 and the ratio K.

Steps 1301 through 1304 are the same as steps 501 through 504 of FIG. 5.

In step 1305, the RB assigning unit 1105 of the base station (BS) 1100 selects the resource blocks having a high first propagation quality CQI1 based on the first propagation quality CQI1 of the first wireless section received in step 1302, and creates the first resource block assignment information RB1. Accordingly, resource blocks of high quality are preferentially assigned.

In step 1306, the ratio determining unit 1106 of the base station (BS) 1100 calculates the number of resource blocks assigned in the first wireless section based on the first resource block assignment information RB1 created in step 1305. Furthermore, the ratio determining unit 1106 calculates the number of resource blocks that are to be assigned in the second wireless section for attaining the same propagation quality as that of the first wireless section, based on the second resource block assignment information RB2 of the second wireless section received at step 1304.

In step 1307, the ratio determining unit 1106 calculates the ratio K based on the number of resource blocks in the first and second wireless sections calculated in step 1306.

In step 1308, the transmitting unit 1109 of the base station (BS) 1100 transmits, to the relay station (RS) 1200, the first resource block assignment information RB1 created in step 1305 and the ratio K calculated in step 1307.

In step 1309, the RB assigning unit 1205 of the relay station (RS) 1200 creates the second resource block assignment information RB2 based on the first resource block assignment information RB1 and the ratio K received in step 1308. The second resource block assignment information RB2 is created in consideration of the offset value for each mobile station. The method of determining the offset value is as described at "Third embodiment: Relay station".

In step 1310, the second resource block assignment information RB2 created in step 1309 is transmitted to the mobile station MS via the coding unit 1206, the modulating unit 1207, the transmitting unit 1208, and the antenna 1201.

Third Embodiment: Resource Block Assignment Information

Figure 14A:
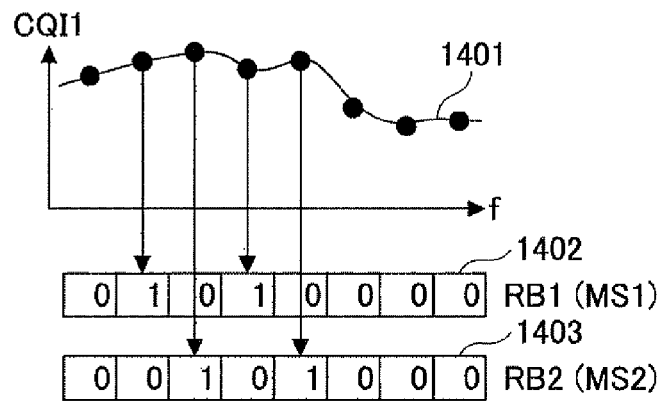
FIGS. 14A through 14C are for describing a method of generating resource block assignment information according to the third embodiment.
Figure 14B:
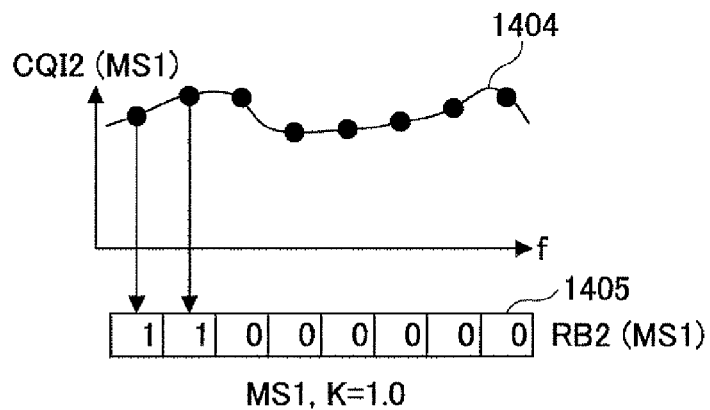
Figure 14C:
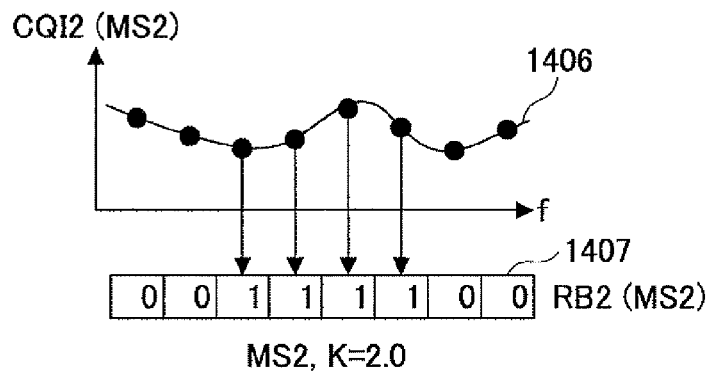

FIGS. 14A through 14C are for describing a method of generating resource block assignment information according to the third embodiment. FIGS. 14A through 14C are different from FIGS. 6A through 6C in terms of the method of generating the first resource block assignment information RB1 and the second resource block assignment information RB2. The elements denoted by 1401 through 1407 in FIGS.

14A through 14C correspond to the elements denoted by 601 through 607 in FIGS. 6A through 6C.

As illustrated in FIG. 14A, the RB assigning unit 1105 of the base station (BS) 1100 creates first resource block assignment information RB1 "01010000" (1402) for a first mobile station MS1 and first resource block assignment information RB1 "00101000" (1403) for a second mobile station MS2. At this time, the first resource block assignment information RB1 is created such that resource bocks having a high first propagation quality CQI1 are selected.

The ratio determining unit 1106 of the base station 1100 calculates the number of resource blocks assigned from the first resource block assignment information RB1 determined by the RB assigning unit 1105 to the first wireless section. As seen in FIG. 14A, two resource blocks are assigned to the mobile station MS1 and two resource blocks are assigned to the mobile station MS2.

The ratio determining unit 1106 of the base station 1100 determines, based on the second propagation quality CQI2, how many of the resource blocks assigned in the first wireless section are to be assigned in the second wireless section starting from the leading resource block (or from the resource block corresponding to the next number of the offset value) so that transmission becomes possible.

As illustrated in FIG. 14B, as for the mobile station MS1, approximately the same propagation quality CQI as that of the first wireless section is attained in the second wireless section (1404). In this case, in the second wireless section, the same number of resource blocks as the first wireless section is to be assigned. Accordingly, a ratio K=1.0 is obtained.

The RB assigning unit 1205 of the relay station 1200 creates the second resource block assignment information RB2 based on the number of resource blocks assigned in the first wireless section and the ratio K=1.0. In a case where the second resource block assignment information RB2 of the mobile station MS1 is created first, the offset value is zero, and therefore two resource blocks starting from the leading resource block are assigned. As a result, the second resource block assignment information RB2 of the mobile station MS1 is "11000000" (1405).

As illustrated in FIG. 14C, as for the mobile station MS2, a propagation quality CQI that is lower than that of the first wireless section is attained in the second wireless section (1406). In this case, in the second wireless section, two times as many resource blocks as that of the first wireless section are to be assigned. Accordingly, a ratio K=2.0 is attained.

When the RB assigning unit 1205 of the relay station 1200 creates the second resource block assignment information RB2 of the mobile station MS2 after that of the mobile station MS1, there are already two resource blocks assigned as illustrated in FIG. 14B, and therefore the offset value is two. Accordingly, for the mobile station MS2, four resource blocks starting from the third resource block are assigned. As a result, the second resource block assignment information RB2 of the mobile station MS2 is "00111100" (1407).

According to an aspect of the present invention, the number of bits in the resource block assignment information is reduced, and the load on the control channel is reduced.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station connected to a relay station that relays wireless signals from a mobile station, the base station comprising:
a resource block assigning unit configured to generate first resource block assignment information of a first wireless section between the bases station and the relay station based on a first propagation quality of the first wireless section;
a ratio determining unit configured to calculate a ratio between a number of first resource blocks assigned to the first wireless section and a number of second resource blocks to be assigned to a second wireless section between the relay station and the mobile station; and
a transmitting unit configured to transmit the first resource block assignment information and the ratio to the relay station.

2. The base station according to claim 1, wherein
the number of first resource blocks is calculated based on the first propagation quality, and
the number of second resource blocks is calculated based on a second propagation quality of the second wireless section.

3. The base station according to claim 1, wherein
the number of first resource blocks is calculated based on the first resource block assignment information, and
the number of second resource blocks is calculated based on a second propagation quality of the second wireless section.

4. The base station according to claim 1, wherein
the first resource block assignment information is created by selecting resource blocks starting from a resource block having a highest first propagation quality, or by selecting resource blocks having the first propagation quality that is higher than a predetermined value.

5. A resource assigning method performed at a base station connected to a relay station that relays wireless signals from a mobile station, the resource assigning method comprising:
generating first resource block assignment information of a first wireless section between the base station and the relay station based on a first propagation quality of the first wireless section;
calculating a ratio between a number of first resource blocks assigned to the first wireless section and a number of second resource blocks to be assigned to a second wireless section between the relay station and the mobile station; and
transmitting the first resource block assignment information and the ratio to the relay station.

6. A relay station for relaying wireless signals from a mobile station to a base station, the relay station comprising:
a receiving unit configured to receive data; and
a resource block assigning unit configured to generate resource block assignment information, wherein
the receiving unit receives, from the base station,
first resource block assignment information of a first wireless section between the base station and the relay station based on a first propagation quality of the first wireless section, and
a ratio between a number of first resource blocks assigned to the first wireless section and a number of second resource blocks to be assigned to a second wireless section between the relay station and the mobile station, wherein the resource block assigning unit generates second resource block assignment information of the second wireless section based on the first resource block assignment information and the ratio.

7. An operation method performed by a relay station for relaying wireless signals from a mobile station to a base station, the operation method comprising:

receiving, from the base station,
first resource block assignment information of a first wireless section between the base station and the relay station based on a first propagation quality of the first wireless section, and
a ratio between a number of first resource blocks assigned to the first wireless section and a number of second resource blocks to be assigned to a second wireless section between the relay station and the mobile station; and generating second resource block assignment information of the second wireless section based on the first resource block assignment information and the ratio.

8. A relay station for relaying communication from a mobile station to a base station, the relay station comprising:
a receiving unit configured to receive first resource block assignment information of a first wireless section between the base station and the relay station;
a ratio determining unit configured to calculate a ratio between a number of first resource blocks assigned to the first wireless section and a number of second resource blocks to be assigned to a second wireless section between the relay station and the mobile station; and
a resource block assigning unit configured to generate second resource block assignment information of the second wireless section based on the first resource block assignment information and the ratio.

9. The relay station according to claim 8, wherein
the number of first resource blocks is calculated based on a first propagation quality of the first wireless section, and
the number of second resource blocks is calculated based on a second propagation quality of the second wireless section.

10. The relay station according to claim 8, wherein
the number of first resource blocks is calculated based on the first resource block assignment information, and
the number of second resource blocks is calculated based on a second propagation quality of the second wireless section.

11. The relay station according to claim 8, wherein
the first resource block assignment information is created by selecting resource blocks starting from a resource block having a highest first propagation quality of the first wireless section, or by selecting resource blocks having the first propagation quality that is higher than a predetermined value.

12. An operation method performed by a relay station for relaying wireless signals from a mobile station to a base station, the operation method comprising:
receiving first resource block assignment information of a first wireless section between the base station and the relay station;
calculating a ratio between a number of first resource blocks assigned to the first wireless section and a number of second resource blocks to be assigned to a second wireless section between the relay station and the mobile station; and
generating second resource block assignment information of the second wireless section based on the first resource block assignment information and the ratio.

\* \* \* \* \*